Inventors:
Robert R. Russell,
Harvey E. Cline,
Warren De Sorbo,
by Jane M. Binkowski
Their Attorney.

Inventors:
Robert R. Russell,
Harvey E. Cline,
Warren De Sorbo,
by Jane M. Binkowski
Their Attorney.

Inventors:
Robert R. Russell,
Harvey E. Cline,
Warren De Sorbo,
by Jane M. Binkowski
Their Attorney.

United States Patent Office 3,594,134
Patented July 20, 1971

3,594,134
PROCESS FOR PRODUCING POROUS METAL FILMS AND ARTICLES PRODUCED THEREBY
Robert R. Russell, Burnt Hills, Harvey E. Cline, Latham, and Warren De Sorbo, Ballston Lake, N.Y., assignors to General Electric Company
Filed Dec. 30, 1968, Ser. No. 787,837
Int. Cl. B23p 1/00; C23b 5/48; B29c 17/08
U.S. Cl. 29—191.4
19 Claims

ABSTRACT OF THE DISCLOSURE

A process for preparing a metallic film with substantially parallel and uniform apertures of small cross-section and uniform distribution useful as a filter. An alloy is cast which in the solid state is comprised of at least two phases. The cast alloy is directionally solidified to produce a body wherein one of the phases is present as a plurality of substantially parallel rods passing through a matrix comprised of the second or other phases. The directionally-solidified body is etched to remove the rodlike phase to form straight-through apertures or, if desired, recesses. A material is placed on an etched area of the etched body to form a negative replica of the recesses or holes. The material is then stripped away and metal is deposited on its negative replica surface. The resulting deposited metallic film is then recovered.

The present invention relates generally to the art of producing articles having straight-through substantially parallel openings of apertures of uniquely small cross-sectional dimension.

It has long been recognized that a thin sheet-like body having straight-through openings of extremely small size would have a number of potentially important uses. In the past, metal filters have been made by weaving wires to form fine screens but the resulting holes are coarse. In another method, a fine metal powder is mixed with another powder which may be metal, and the mixture is sintered to form a dense mass which is then etched to remove one of the powders. The resulting product may have fine pores, but the pores are not regular. Porous bodies such as expanded Vycor tubing and certain filter papers have openings or apertures of minimum cross-sectional dimension, but their utility has been quite limited because they cannot be produced with straight-through apertures. In addition, they cannot be used for a number of applications where high tensile strength or electrical or metallic properties are desired. Although, filters having straight-through holes of small cross-section have been prepared by irradiating a sheet of plastic and etching away the radiation tracks, this method cannot be used on metals.

By virtue of the present invention, this porous metallic films are produced for uses not suitable for prior art porous bodies. The pores are straight and of uniform size, and they are distributed substantially uniformly in the film. In addition, by partially or completely filling these pores or apertures with selected materials, composite bodies for a wide variety of special purposes and uses can be made.

Those skilled in the art will gain a further and better understanding of the present invention from the detailed description set forth below, considered in conjunction with the figures accompanying and forming a part of the specification, in which.

Figure 1:
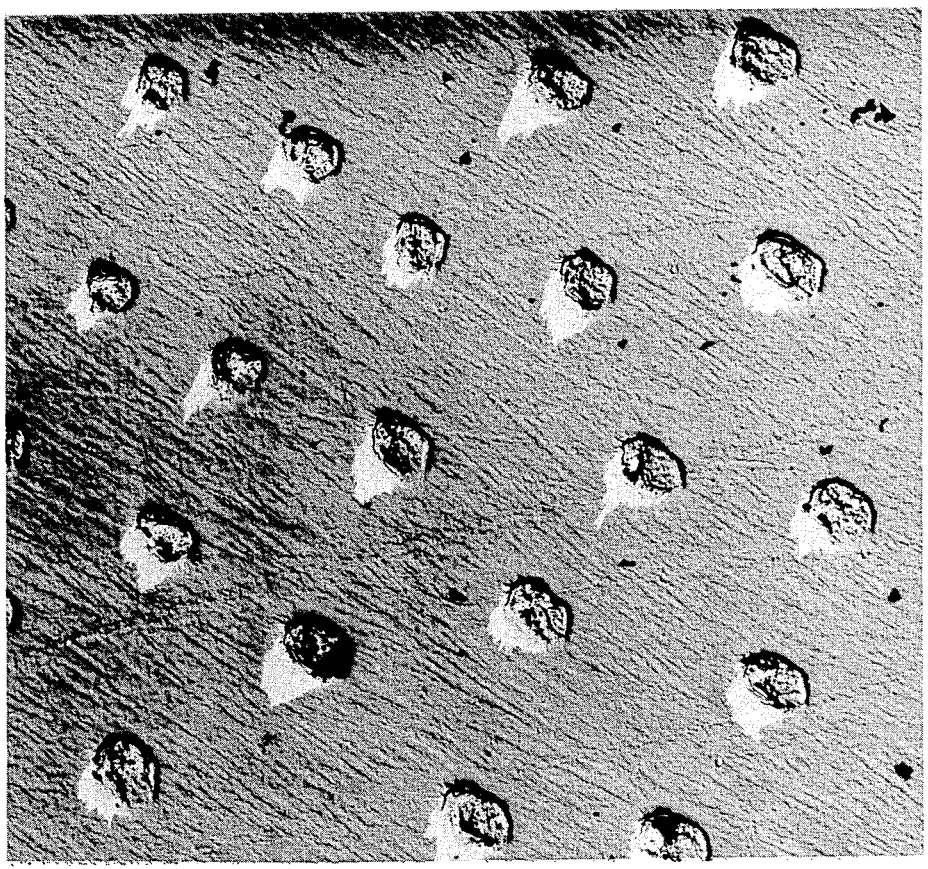
FIG. 1 is a micrograph (25,000 times magnification) of the etched specimen produced by partially removing the molybdenum rod-like phase from the directionally-solidified NiAl-Mo specimen as disclosed in Example 1.

Described broadly and generally, an article of this invention is a thin metal film which has a plurality of pores or apertures of minimum cross-sectional dimensions. These apertures are aligned, that is, disposed with their longitudinal axes substantially parallel to each other, and in all instances, the apertures are straight pores as distinguished from the tortuous passageways characteristic of the expanded Vycor and filter paper articles of the prior art.

As used herein, by the terms "pore," "aperture" or "hole" is meant a hole extending in a substantially straight line from one surface of the etched sample through the opposite surface. In addition, the word "phase" defines a quantity of matter having substantially the same properties such as crystal structure and composition. By the term "directional solidification" is meant the solidification in a single direction.

Briefly stated, the process of the present invention comprises providing a cast alloy which in the cast solid state is comprised of at least two phases. The cast alloy is directionally solidified to produce a structure wherein one of the phases is present as a plurality of substantially parallel rods passing through the second phase which serves as a matrix. The directionally-solidified structure is etched to remove the rodlike phase to form straight-through apertures, or if desired, recesses. A material is placed on an etched surface of the etched body to produce a negative replica of said recesses or holes. The material is then stripped away and on its negative replica surface there is deposited a metal. The projections of the replica interrupt the continuity of the deposited metal so that when the resulting porous metallic film is removed from the replica, it has porosity corresponding to the replica projections.

The alloy of the present invention is an eutectic alloy which is comprised of at least two phases in the solid state. It need only be of a composition which upon being cast and directionally solidified will produce the rodlike phase. Such a composition is the eutectic composition or a composition close thereto. The range that the composition may vary from the eutectic is determinable empirically for the specific alloy. For a majority of these alloys, such range is generally up to about 10 percent by weight from the eutectic.

There are a number of autectic alloys which upon being directionally solidified have one phase present in a rodlike form as required by the present invention. Representative of these alloys are NiAl-Cr, Ni-W, NiAl-Mo, Al-Al$_3$Ni, Ta-Ta$_2$C, CoAl-Co, Cb-Cb$_2$C, Cb-Th, Ni-Ni$_{17}$Th$_2$, Ni-Ni$_3$P, Co-Co$_{17}$Y$_2$, Fe-FeSb, Cr-C, Ti-B, Ti-Th, V-V$_3$Si, Ni-Ni$_3$B, InSb-Sb, and Cu-Cr. Typical of alloys having non-metallic characteristics which are also useful in the present invention are NaF-LiF, LiF-NaCl, NaF-NaCl and NaF-NaBr.

Generally, in carrying out the instant process, the alloy components are melted together to obtain as uniform a molten sample as possible. The molten sample is then cast by a conventional method to the desired size.

The cast alloy can be directionally solidified by a number of conventional methods which allow passage of the solid-liquid interface in one direction, i.e., cooling of the sample from one end to the other. Generally, the apparatus is comprised of a heated vertical mold provided with a cooling system at its lower end, usually water, and means for controlling the rate of solidification, generally by moving the ingot-containing mold at a constant rate away from the heat source used to melt the ingot.

The rodlike phase produced in the directionally solidified alloy depends upon the specific composition of the alloy and the rate at which it is solidified. The rate of solidification may vary widely. The specific rate of solidification is determinable empirically and depends largely on the particular composition of the alloy and size of the rods to be produced. Satisfactory directional solidification of a number of alloys can be carried out at at rate in the range of about $1 \times 10^{-5}$ centimeter per second to about 0.1 centimeter per second. The faster the rate of solidification, the finer and closer are the rods. Conversely, with a decreasing rate of solidification, fewer rods will be formed but these rods will have, substantially, a correspondingly larger diameter. Too high a rate of solidification for a particular alloy composition may result in non-uniform rods. For most applications, the rods may have a thickness ranging from about 1000 angstroms in diameter to about 10 microns in diameter. Correspondingly, the density of the rods may range from about $10^9$ per square centimeter to about $10^5$ per square centimeter.

Generally, prior to etching, the directionally-solidified ingot is cut in a direction transverse to the rod phase to a size desired for etching. Any suitable means such as a moving saw, cut-off wheel, or spar cutting can be used. The slices may be of any desired thickness depending largely on the strength of the alloy and final use of the etched product. The slice of alloy can be etched directly, or preferably, it is polished prior to etching to remove the distorted surface layer generated during mechanical slicing. Such polishing is also useful to reduce the slice to the desired thickness.

The particular etchant used depends largely upon the specific composition of the rodlike phase to be removed as well as the matrix through which it passes. Such compositions are known from phase diagrams in the literature. If the phase diagram is not available, the compositions are easily determinable by standard metallographic procedure and X-ray analysis. The etchant used should selectively etch the rodlike phase and should not significantly affect the remainder of the specimen.

The etching can be carried out in a number of conventional ways. For example, the alloy specimen can be immersed in a solution of the etchant until the rods are etched away to form holes. However, if recesses rather than holes are desired, only one surface of the specimen should be contacted with the etchant until the rods are etched to form recesses of the desired depth. In some instances, especially when the specimen is as thin as a foil, electrolytic etching is preferred because it can be carried out at a fast but easily controlled rate. Upon completion of the etching, the specimen is preferably rinsed with water or neutralizer to stop further etching action.

In the present invention, the specific thickness of the etched specimen can vary widely and depends somewhat on its final use, i.e., the replica needed for producing the specific metal film. The holes or recesses formed by removing the rods are of substantially uniform size. Their cross-sectional area depends on the thickness of the rods. For most applications, a suitable diameter of the holes or recesses formed by removing the rodlike phase will fall within the range of 1000 angstroms to about 10 microns.

Any material which can conform to an etched area of the etched body to produce a negative, substantial replica, of the holes or recesses therein can be used. The replica can be formed by a number of conventional methods. For example, improved conformation may be obtained by the use of a vacuum and/or by the application of pressure. Materials especially useful for forming inexpensive replicas are polymers and elastomers. These materials can be used in a softened or liquid form, or in the form of solutions, dispersions, or emulsions. For example, a thermoplastic polymer can be heated to the desired softened state, pressed against the etched area and allowed to harden thereon. The thermoplastic polymer can also be heated until liquid and then allowed to solidify on the etched area. Likewise, a thermosetting polymer, prior to being converted to its thermosetting form, can be used in liquid or a soft form and allowed to harden on the etched area to form the replica. For a number of applications, it is suitable to flow onto the etched area a solution, dispersion or emulsion of the polymer or elastomer and allow it to dry or cure in place. The replica can be recovered in a number of ways, as for example, by stripping it from the master.

Representative of thermoplastic polymers which can be used in the present process to produce replicas are cellulose acetate, acetylcellulose, polyethylene, polypropylene and polystyrene. Representative of thermosetting polymers usefful in the present invention are epoxy resins cured by conventional curing agents. Natural rubber as well as synthetic rubbers can also be used.

The negative replica area of the material is used as a substrate on which there is deposited metal to produce the porous metallic film of the present invention. A wide variety of metals as well as alloys can be used for deposition on the substrate. Representative of these metals is gold, copper, nickel, aluminum, tin, niobium, and tantalum. The deposition can be carried out in any conventional manner which does not significantly affect the structure of the replica. For example, the metal can be deposited by vapor deposition. The thickness of the metal deposited on the replica substrate is not critical and can vary widely depending largely on its final use. It need only be of sufficient thickness to be continuous, i.e., continuous in the areas that surround the replica projections which form the pores in the resulting metallic film. However, the film can be deposited on the substrate in a thickness to equal the replica projections or somewhat greater. Generally, deposited metal covering the projections of the replica collapses to form holes when separated from the replica substrate. If this collapsing effect does not occur, these cap portions of the metallic film can be etched to form holes by etching the film in a conventional manner since the cap portions will etch through faster than the surrounding portions of the film which are thicker. If desired, the pore diameter can be increased by further etching.

The porous metallic film of the present invention generally has a uniform array of straight through, substantially parallel holes which are usually substantially cylindrical throughout their length and of uniform cross-section. This porous metallic film is particularly useful as a filter or membrane for very fine materials.

The porous metallic film of the present invention can be produced with tapered pores by tapering the holes, i.e., by tapering the surrounding protruding matrix, of the etched specimen used as a master. Conventional methods for such tapering can be used, as for example, by withdrawing that portion of the matrix slowly from the electrolyte while it is being electrolytically etched. Such filters are useful to allow greater fluid flow for a given limiting size. The degree of tapering in the pores of the metallic film can be controlled by controlling the size of the tapered portions of the matrix, i.e., the holes in the matrix, by conventional etching techniques as well as the thickness of the replica material.

In one embodiment of the present invention, the pores of the present film are reduced by depositing a metal on the film. In such a deposition, the metal generally preferentially deposits at the boundaries of the pores and also substantially strengthens the film. This deposition of a metal on the porous metallic film can be carried out in a number of conventional ways such as by electroplating, vapor deposition and sputtering. The metal to be deposited on the porous metallic film can be the same as that of the film or different. A wide variety of metals as well as alloys can be used for such deposition, the selection of which depends largely on the final use of the porous film. Typical metals are gold, copper and nickel.

In another embodiment of the present invention, composites can be formed for a wide variety of special applications by filling the apertures of the metallic film of the present invention with a foreign material, i.e., a material different from that of the film. For example, they can be filled with superconductive material or with iron particles to produce oriented, single-domain ferromagnetic sheet.

It will be apparent to those skilled in the art that a number of variations are possible without departing from the scope of the invention.

All parts used herein are by weight unless otherwise noted.

The invention is further illustrated by the following examples.

In the following examples, a conventional apparatus was used to directionally solidify the alloy. It included an induction furnace for melting the alloy and a water cooled based for solidification.

EXAMPLE 1

In this example, a gold porous film was produced.

An alloy comprised of 56.5 percent by weight nickel, 25.5 percent by weight aluminum and 19 percent by weight molybdenum was prepared by melting the components, each of which was about 99.9 percent pure, under argon in an alumina crucible. The molten alloy was cast under argon in a copper mold to produce a cylindrical ingot about 2.2 cm. in diameter and 15 cm. in length.

The ingot was placed in an alumina crucible and was directionally solidified at a rate of $6 \times 10^{-4}$ cm. per second (0.8 inch per hour). Metallographic examination of both ends and along the length of the ingot showed it to be composed of molybdenum-rich rods in a nickel aluminum-rich matrix wherein the rod phase was substantially perpendicular to the planes of both ends of the ingot. The ingot was sliced transversely to the rod growth direction by a cut-off machine. Each slice was about 50 mls thick. The distorted surface layers generated during slicing were mechanically polished to a mirror-smooth surface. Metallographic examination of the resulting polished specimen showed a uniform array of molybdenum-rich rods generally perpendicular to the cut surface.

The specimen was made the anode in a conventional electrolytic cell having an electrolyte of 3 percent oxalic acid in water. Stainless steel was used as the cathode. A potential of 3 v. DC was applied for 30 minutes. The etched specimen was then rinsed with water and examined metallographically. The molybdenum-rich rod phase had been substantially removed to a depth of $50\mu$ leaving an etched metallic material wherein the recesses measured approximately 0.3 to 0.5 micron in diameter as determined by an electron beam microscope and an electromicrograph which is FIG. 1.

The recesses of the etched specimen had a density of about $7 \times 10^7$ per sq. cm. as determined by counting the recesses from a micrograph and knowing the magnification of the micrograph, calculating the number of recesses per square centimeter.

This etched metal specimen was then used as a master to prepare a thin porous gold film by a replication technique. Specifically, a 5 ml. thick sheet of cellulose acetate was softened in acetone at room temperature and then applied to the etched recess-containing surface of the specimen. After drying, the cellulose acetate film was stripped away. The cellulose acetate surface portion adjacent to the etched surface of the specimen was a negative replica of that surface.

Figure 2:
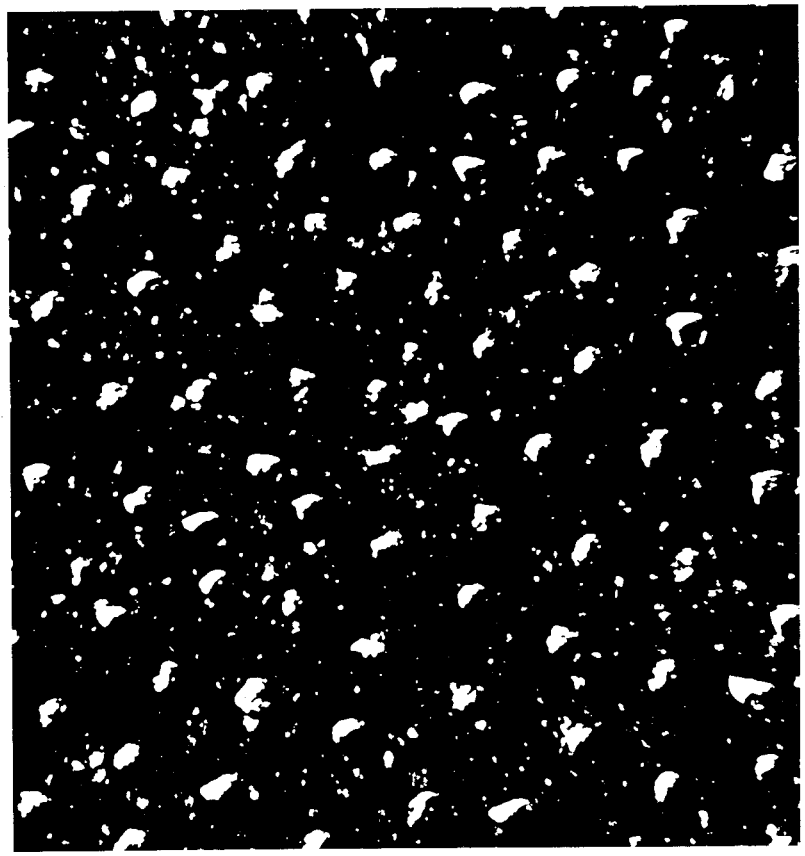
FIG. 2 is a micrograph (10,000 times magnification) of a porous gold film formed from a replica of the etched specimen of FIG. 1 as disclosed in Example 1.
Figure 3:
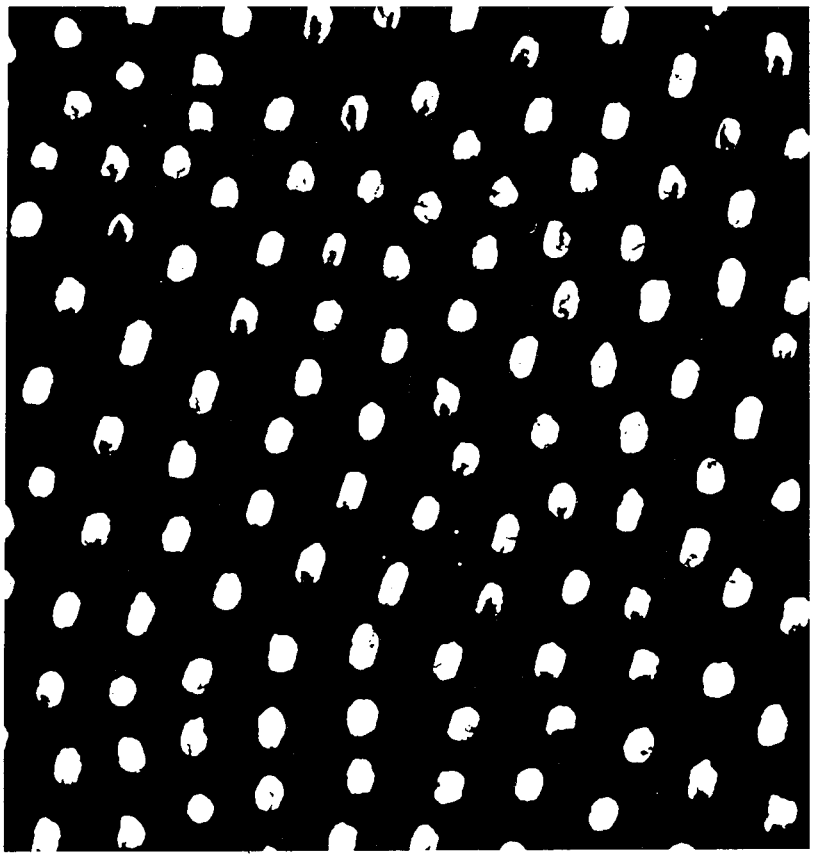
FIG. 3 is a micrograph (magnified 10,000 times) of the gold film of FIG. 2 after it had been etched to enlarge the pores as disclosed in Example 1.

A thin gold film about 1200 angstroms thick was vacuum evaporated onto the cellulose acetate replica surface under a vacuum of below $1 \times 10^{-5}$ mm. Hg. The deposited gold film is shown in FIG. 2. As shown in FIG. 2, a very thin layer of gold partially covered the projections in the cellulose acetate negative replica. The resulting cellulose acetate-gold film composite was immersed in acetone at room temperature until the cellulose acetate dissolved leaving the gold film. The gold covering the cellulose acetate projections, i.e., caps, collapsed when the cellulose acetate dissolved to partially close the pores in the gold film. These caps were removed by immersing the gold film in an etching solution comprised of one part concentrated nitric acid, two parts concentrated hydrochloric acid and three parts water for about 3 seconds at room temperature. The resulting etched porous gold film was examined metallographically. It had straight pores which were substantially cylindrical in form. The pores were also substantially uniform in size which was approximately 0.5 micron in diameter. A micrograph of a surface of the etched gold film is shown in FIG. 3.

EXAMPLE 2

The etched gold film prepared in Example 1 was treated in this example to produce a controlled reduction of its pores. Specifically, a conventional "Watts" type nickel plating cell was used with the etched gold film supported on an electron microscope grid as cathode, and nickel as the anode. The electrolyte was maintained at 43° C. and was comprised of a mixture of 24 grams of nickel sulfate, 4.5 grams nickel chloride, 3 grams boric acid and 100 cc. water. A potential of 1 v. DC was used to carry out the electrodeposition.

Figure 4:
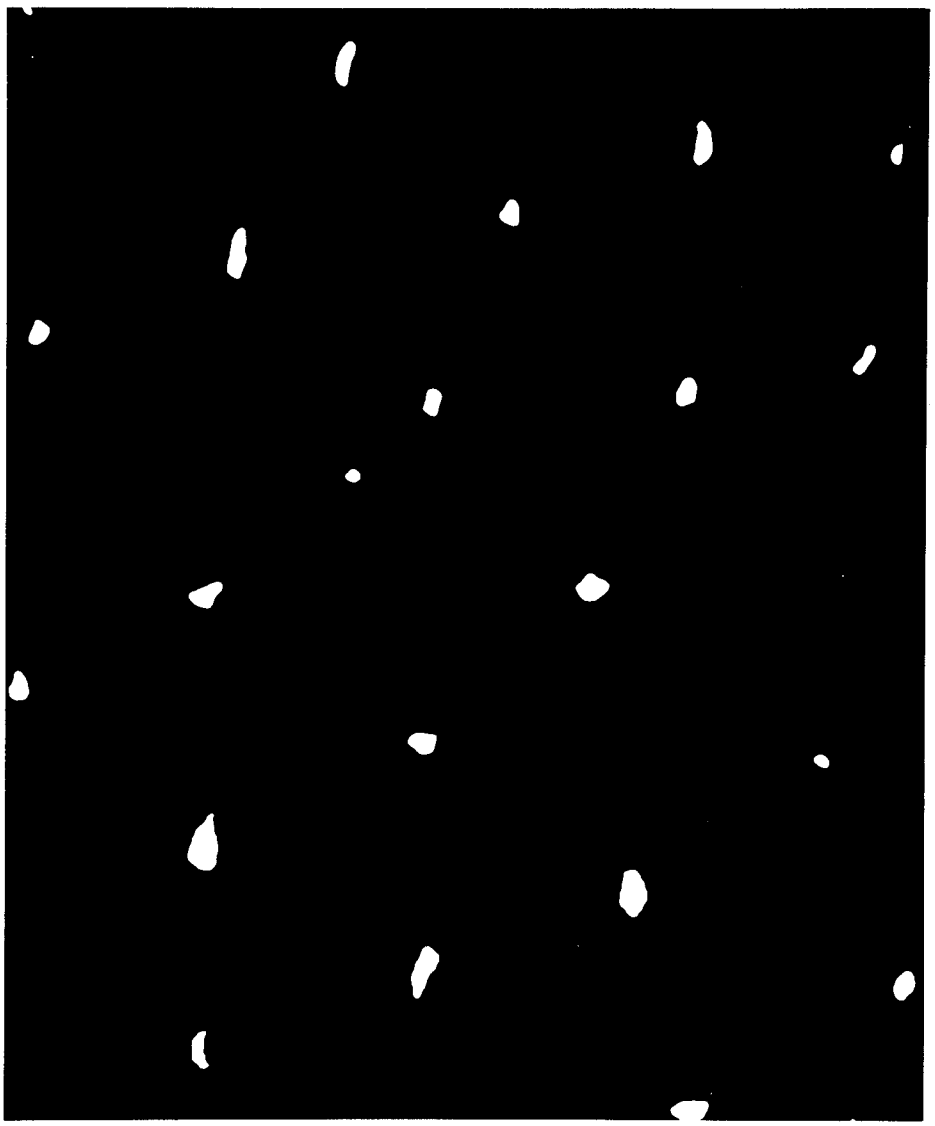
FIG. 4 is a micrograph (25,000 times magnification) of the gold film of FIG. 3 after electroplating with nickel to reduce the pores to about 0.2 micron as disclosed in Example 2.
Figure 5:
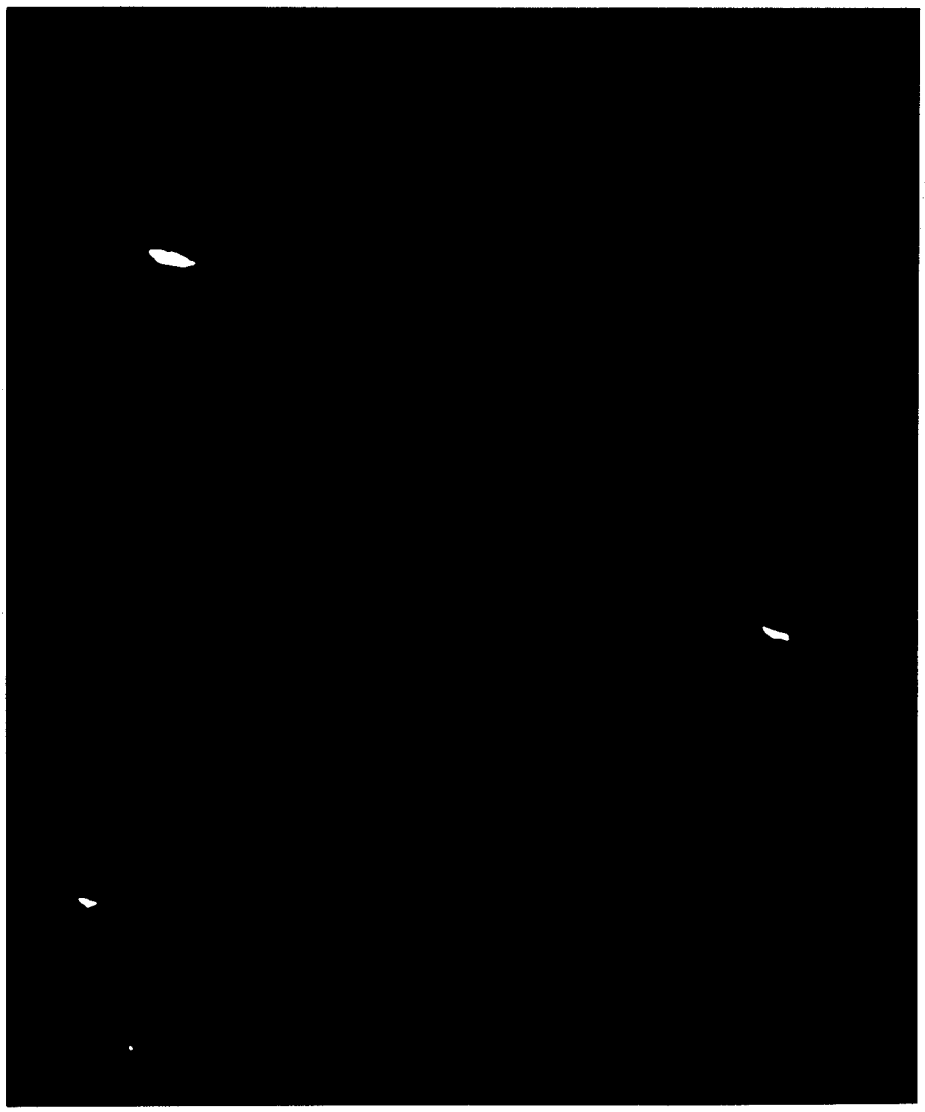
FIG. 5 is a micrograph (75,000 times magnification) of the film of FIG. 4 after additional nickel had been electroplated thereon to reduce the pores to approximately 300 angstroms as disclosed in Example 2.

The gold film cathode was immersed in the electrolyte for 30 seconds and then was examined metallographically. The diameter of the pores had been reduced substantially uniformly to a diameter of approximately 0.2 micron and is shown in FIG. 4 which is a micrograph of its surface magnified 25,000 times. The gold film was then reimmersed into the electrolyte for another 30 seconds under the same conditions and again examined metallographically. The holes had been reduced to approximately 300 angstroms and is illustrated by FIG. 5 which is a micrograph of its surface. The final thickness of the gold film was about 0.5 micron. The electrodeposited metal greatly strengthened the porous film.

EXAMPLE 3

The etched metal specimen used as a master in Example 1 was also used in this example to produce a porous gold film. In this example, however, a two-step replication method.

Acetylcellulose film, about 0.34 mm. thick, was cut slightly larger than the etched recess-containing surface of the metallic master. A small amount of methyl acetate solvent was dropped on the surface of the master and spread over it. The acetylcellulose film was then laid over the solvent-wet surface from one end to prevent bubble formation underneath. The solvent softened the film sufficiently so that, after drying, when the film was stripped off, it was a negative replica of the master.

A thin gold film, about 5000 angstroms thick, was evaporated onto the negative replica to the surface previously in contact with the master surface. The pressure during evaporation was kept below $1 \times 10^{-5}$ mm. Hg.

A layer of molten wax, i.e., paraffin having a melting point of about 40° C., was placed over the gold film and allowed to solidify. The wax-gold film-acetyl-cellulose composite was mounted on a 200 stainless steel mesh screen support with the acetylcellulose layer against the screen. The entire resulting assembly was then immersed in methyl acetate at room temperature until the acetylcellulose film dissolved. The methyl acetate solvent was then heated to approximately 40° C. to remove the wax layer which served as a substrate to reinforce the gold film in the subsequent process of separating the acetylcellulose film from it. After the wax had been removed, the gold film supported on the metal screen was rinsed in anhydrous methyl acetate to remove any residual acetylcellulose and/or wax. A light micrograph of the surface of the gold film showed the pore size to be $0.6\mu$ or less with the majority of the pores ranging in diameter from 0.5 to 0.6 micron.

EXAMPLE 4

In this example, the membrane characteristics of the porous gold film produced in Example 3 were determined.

The assembly comprised of the gold film resting on the 200 stainless steel mesh screen support was mounted and epoxied in place between two Lucite washers and allowed to air dry. This structure was mounted so that the porous gold film covered an opening at one end of a chamber made of Lucite. Through a second opening, water was added to the chamber and pressure could be applied to the water contained in the chamber. A pipette was mounted outside the chamber but adjacent to the screen support to receive all water passed through the porous gold film, i.e., the membrane.

Pressures up to about 0.12 atmosphere were applied to the water contained in the cell. The procedure was repeated using, instead of water, a 50–50 methanol-water solution as well as a 50–50 ethanol-water solution.

The pores in the gold film were determined to have a flow permeability directly proportional to the applied pressure and inversely proportional to the solution viscosity as predicted by viscous flow theroy, i.e., Poisseuille's Law, $$\text{Flow Permeability} = \frac{NA\pi R^4 (\Delta\rho)}{8\eta L}$$

For example a pressure of 40 p.s.i. or 0.10 atm. on the water contained in the chamber resulted in a flow permeability of 0.30 cc./cm.$^2$ sec. whereas the same pressure applied to 50–50 volume percent methanol-water solution resulted in a flow permeability of 0.18 cc./cm.$^2$ sec., and when applied to 50–50 percent ethanol-water solution, the flow permeability was 0.11 cc./cm.$^2$ sec.

In plotting Flow Permeability (cc./sec. cm. atm.), against reciprocal viscosity (centipoise $^{-1}$) the slope of the line using the above equation for flow permeability gives a pore radius R of about $0.3\mu$ compared with the observed value of less than $0.5$–$0.6\mu$. In this respect N, the pore concentration, is approximately $8.5 \times 10^7$ pores/cm.$^2$ and thickness of the gold film L=0.5 micron.

Additional methods of treating alloys to produce a solid two phase structure wherein one phase is distributed in a fine form in a matrix comprised of the second or other phases and wherein said finely distributed phase is selectively removed by etching and/or articles formed therefrom are disclosed and claimed in the following copending applications:

U.S. patent application Ser. No. 787,838 filed of even date herewith in the name of Daeyong Lee and assigned to the assignee hereof is directed to the treatment of an alloy having the characteristic of being comprised of at least two phases in the solid state to produce at least one phase in a fine form distributed in a matrix comprised of the second or other phases. The resulting treated structure is etched to remove the finely distributed phase to produce apertures or, if desired, recesses.

U.S. patent application Ser. No. 787,751 filed of even date herewith in the name of Daeyong Lee and Robert R. Russell and assigned to the assignee hereof is directed to cast alloys having a two phase lamellar structure. The cast structure is plastically deformed to convert the lamellar structure to a substantially equiaxed structure and one of the equiaxed phases is then selectively removed by etching to produce recesses or apertures.

U.S. patent application Ser. No. 787,802 filed of even date herewith in the name of Harvey E. Cline, Robert R. Russell and Warren De Sorbo, and assigned to the assignee hereof is directed to the directional solidification of a eutectic alloy to produce a structure wherein one of the phases is present as a plurality of substantially parallel rods passing through the second or other phases which serve as the matrix. The directionally solidified structure is etched to selectively remove the rodlike phase to form straight through apertures or, if desired, recesses.

What we claim as new and desire to secure by Letters Patent in the United States is:

1. A method for preparing a metallic film with substantially parallel and uniform apertures which comprises providing a cast alloy which in the cast solid state is comprised of at least two phases, directionally solidifying said cast alloy to produce a body wherein one phase is present as a plurality of substantially parallel rods, etching said body to substantially remove said rods to form recesses or holes, substantially conforming a material to a surface of said etched body to form a negative replica of said recesses or holes in said surface portion of material, recovering said material from said etched body, depositing a metal film on said negative replica surface of said material, and recovering the deposited metal film.

2. A method according to claim 1 wherein said etching was carried out electrolytically.

3. A method according to claim 1 wherein said alloy is of eutectic composition or within about 10% of eutectic composition.

4. A method according to claim 3 wherein said alloy contains at least one element which is a metal.

5. A method according to claim 3 wherein said alloy is non-metallic.

6. A method according to claim 3 wherein said alloy is NiAl-Mo.

7. A method according to claim 1 wherein said directionally solidified body is in the form of an ingot, cutting said ingot transversely to produce a slice of ingot and etching said rods from said slice of ingot.

8. A method according to claim 1 wherein said material is a polymer.

9. A method according to claim 8 wherein said polymer is an elastomer.

10. A method according to claim 1 wherein the metallic film is gold.

11. A method according to claim 1 wherein the apertures of the metallic film are reduced by depositing a metal on said film.

12. The aperture-containing metallic film produced by the process of claim 11.

13. The aperture-containing metallic film of claim 12 wherein said apertures contain a foreign material.

14. A method according to claim 11 wherein the metal deposited on said metallic film is nickel.

15. The aperture-containing metallic film produced by the process of claim 14.

16. The aperture-containing metallic film of claim 15 wherein said apertures contain a foreign material.

17. An aperture-containing metallic film produced by the process of claim 1 having a substantially uniform thickness formed by deposition of the metal and having a substantially uniform array of straight through, parallel apertures of substantially uniform size ranging from about 1000 angstroms to about 10 microns in diameter and having a density from about $10^9$ per square centimeter to about $10^5$ per square centimeter.

18. The aperture-containing metallic film of claim 17 wherein said film is gold.

19. The aperture-containing metallic film of claim 17 wherein said apertures contain a foreign material.

References Cited
UNITED STATES PATENTS

| | | | |
|---|---|---|---|
| 2,166,367 | 7/1939 | Norris | 204—11 |
| 3,097,149 | 7/1963 | Lacroix | 204—146 |
| 3,236,706 | 2/1966 | Kuchek | 156—7 |
| 3,270,381 | 9/1966 | Smith | 164—46 |
| 3,364,018 | 1/1968 | Kirkpatrick | 156—2 |
| 3,417,809 | 12/1968 | Sink | 164—127 |
| 3,485,291 | 12/1969 | Piearcey | 164—127 |
| 3,124,452 | 3/1964 | Kraft | 75—135 |

OTHER REFERENCES

Fabrication of an Ultra-Fine Cb-Cu Composite by Drawing by H. E. Cline et al., Trans. of the American Society of Metals, vol. 59 No. 1, March 1966.

TA-HSUNG TUNG, Primary Examiner

T. TUFARIELLO, Assistant Examiner

U.S. Cl. X.R.

29—163.5, 527.6; 156—7; 164—46, 125; 204—24, 143